United States Patent
Lei et al.

(10) Patent No.: US 11,948,362 B2
(45) Date of Patent: Apr. 2, 2024

(54) OBJECT DETECTION USING A COMBINATION OF DEEP LEARNING AND NON-DEEP LEARNING TECHNIQUES

(71) Applicant: ARCUS HOLDING A/S, Brøndby (DK)

(72) Inventors: Howard Lei, Irvine, CA (US); Edwin Heredia, Los Angeles, CA (US)

(73) Assignee: Arcus Holding A/S, Brøndby (DK)

( * ) Notice: Subject to any disclaimer, the term of this patent is extended or adjusted under 35 U.S.C. 154(b) by 417 days.

(21) Appl. No.: 17/288,869

(22) PCT Filed: Oct. 31, 2018

(86) PCT No.: PCT/US2018/058318
§ 371 (c)(1),
(2) Date: Apr. 26, 2021

(87) PCT Pub. No.: WO2020/091749
PCT Pub. Date: May 7, 2020

(65) Prior Publication Data
US 2022/0004770 A1    Jan. 6, 2022

(51) Int. Cl.
*G06K 9/00* (2022.01)
*G06F 18/21* (2023.01)
(Continued)

(52) U.S. Cl.
CPC .............. *G06V 20/52* (2022.01); *G06F 18/21* (2023.01); *G06F 18/22* (2023.01); *G06T 7/70* (2017.01);
(Continued)

(58) Field of Classification Search
CPC ...... G06V 20/52; G06V 10/25; G06V 10/454; G06V 10/809; G06V 10/82; G06V 20/41;
(Continued)

(56) References Cited

U.S. PATENT DOCUMENTS

| 8,116,527 B2 * | 2/2012 | Sabol | G06T 7/254 |
| | | | 382/270 |
| 8,447,069 B2 * | 5/2013 | Huang | G06T 7/254 |
| | | | 382/103 |

(Continued)

OTHER PUBLICATIONS

Kai Kang, et al., T-CNN: Tubelets with Convolutional Neural Networks for Object Detection from Videos, Aug. 23, 2016, Version 3, pp. 1-11, Internet, https://arxiv.org/abs/1604.02532, XP055405912.

(Continued)

*Primary Examiner* — Gregory M Desire
(74) *Attorney, Agent, or Firm* — Canon U.S.A., Inc. IP Division (57) ABSTRACT

An object detection system includes at least one memory storing instructions, and at least one processor that, upon executing instructions stored in the memory, controls the object detection system to perform functions including inputting a first video frame and a second video frame from a camera; generating a first set of predicted object locations using only one of the first video frame and the second video frame; generating a second set of predicted object locations based on pixel differences between the first video frame and the second video frame; and determining a final set of object locations based on the first set of predicted object locations and the second set of predicted object locations.

18 Claims, 5 Drawing Sheets

(51) Int. Cl.
*G06F 18/22* (2023.01)
*G06K 9/62* (2022.01)
*G06T 7/70* (2017.01)
*G06V 10/25* (2022.01)
*G06V 10/44* (2022.01)
*G06V 10/80* (2022.01)
*G06V 10/82* (2022.01)
*G06V 20/40* (2022.01)
*G06V 20/52* (2022.01)
*G06V 30/19* (2022.01)
*G06V 30/24* (2022.01)

(52) U.S. Cl.
CPC ............ *G06V 10/25* (2022.01); *G06V 10/454* (2022.01); *G06V 10/809* (2022.01); *G06V 10/82* (2022.01); *G06V 20/41* (2022.01); *G06V 30/19173* (2022.01); *G06V 30/248* (2022.01); *G06T 2207/10016* (2013.01); *G06T 2207/20084* (2013.01)

(58) Field of Classification Search
CPC .. G06V 30/19173; G06V 30/248; G06T 7/70; G06T 2207/10016; G06T 2207/20084; G06F 18/22; G06F 18/21
See application file for complete search history.

(56) References Cited

U.S. PATENT DOCUMENTS

| | | | |
|---|---|---|---|
| 9,213,901 B2* | 12/2015 | Bernal | G06V 20/52 |
| 10,217,028 B1* | 2/2019 | Wang | G06T 7/20 |
| 10,528,819 B1* | 1/2020 | Manmatha | G06V 10/764 |
| 10,621,735 B2* | 4/2020 | Saleemi | G06T 7/60 |
| 10,628,961 B2* | 4/2020 | Sundaresan | G06T 7/20 |
| 10,852,420 B2* | 12/2020 | Chondro | G01S 13/867 |
| 10,957,171 B2* | 3/2021 | Heitz, III | H04N 5/76 |
| 11,112,796 B2* | 9/2021 | Djuric | G06N 20/00 |
| 2011/0142283 A1 | 6/2011 | Huang et al. | |
| 2016/0171311 A1 | 6/2016 | Case et al. | |

OTHER PUBLICATIONS

Zhou, Yuqian, et al., Survey of Face Detection on Low-quality Images, Submitted Apr. 19, 2018, 6 pages, Internet, https://arxiv.org/abs/1804.07362, XP033354783.

Wongun Choi, Near-Online Multi-target Tracking with Aggregated Local Flow Descriptor, Apr. 9, 2015, pp. 1-11, Internet, https://arxiv.org/abs/1504.02340v1.

* cited by examiner

OBJECT DETECTION USING A COMBINATION OF DEEP LEARNING AND NON-DEEP LEARNING TECHNIQUES

CROSS-REFERENCE TO RELATED APPLICATIONS

This application is the National Phase application of PCT Application No. PCT/US2018/058318, filed on Oct. 31, 2018 and titled "OBJECT DETECTION USING A COMBINATION OF DEEP LEARNING AND NON-DEEP LEARNING TECHNIQUES". The above cited patent application is hereby incorporated by reference herein in its entirety.

BACKGROUND OF THE INVENTION

Field of the Invention

The present disclosure is directed to a system for detecting objects, and more specifically to detecting objects in video frames from a camera.

Description of Related Art

Several types of systems are known for detecting the position of objects, which may include detecting people or vehicles, for example.

One such system is disclosed in U.S. Pat. No. 5,434,617, entitled "Automatic Tracking Camera Control System." The system described in that patent determines the position of a person in a video camera frame by examining pixel differences between the current and previous camera frames. The positions of pixels with greater differences are used to infer object presence and movement within the video frames, and bounding boxes around the objects are obtained. The camera position is adjusted to track objects based on their positions.

Another system is disclosed in U.S. Pat. No. 9,442,485, entitled "Pixel based image tracking system for unmanned aerial vehicle (UAV) action camera system." The system disclosed in that patent uses an approach for tracking and following a person in a camera feed, where the camera is mounted on a UAV. Pixel differences between the current frame and reference frames are used to determine the movement of the person. Based on information obtained from the pixel differences, the UAV can be re-positioned to track or follow the person.

Yet another system is disclosed in U.S. Pat. No. 8,896,441, entitled "System and method for tracking people." That patent discloses a person-tracking approach using the location signal transmitted from the mobile device of the person of interest.

Still another system is disclosed in U.S. Patent Publication No. 2009/0041297 A1, entitled "Human detection and tracking for security applications." That patent discloses an approach using image-processing features (e.g., Scale Invariant Feature Transform (SIFT)) for human detection and tracking in video signals.

As seen from the above-mentioned prior art, a common image processing approach to detecting objects is to compare the pixel differences between one video frame and the previous one. Areas of higher pixel difference are likely due to object movement, providing an indication of the possible position of an object in the video frame. However, systems based on a pixel difference framework may not provide a level of detection accuracy that is desirable, especially if the objects are not moving or if they are moving slowly. Furthermore, such systems suffer from reduced ability to detect objects in a wide range of conditions, such as blurry images, inadequate light exposure, rainy weather, etc.

In the past five years, Deep Learning methods have been developed that can perform object detection. Research suggests that, over time, systems based on a Deep Learning framework can surpass traditional methods (such as pixel difference methods) in terms of recognition/detection performance, both in terms of accuracy and the range of conditions in which objects are successfully identified. Such detection systems based on a Deep Learning framework involve increased computational complexity and, in some cases, reduced algorithm speed. These may be justified if the system exhibits better performance (for example, in terms of accuracy over a wider range of conditions) relative to pixel difference methods. Moreover, such systems need only a single frame to generate predicted object positions. However, those systems still fail to provide the desired level of accuracy due to false alarm detections (detecting an object in an image where none is actually present) or missed detections (failing to detect an object that actually is present in an image).

SUMMARY OF THE INVENTION

The approach to object detection described herein uses a combination of detection utilizing a Deep Learning framework and detection based on a pixel difference framework.

According to one preferred embodiment, the present invention is directed to an object detection system including at least one memory storing instructions, and at least one processor that, upon executing instructions stored in the memory, controls the object detection system to perform the functions of: inputting a first video frame and a second video frame from a camera; generating a first set of predicted object locations using only one of the first video frame and the second video frame; generating a second set of predicted object locations based on pixel differences between the first video frame and the second video frame; and determining a final set of object locations based on the first set of predicted object locations and the second set of predicted object locations.

According to another preferred embodiment, the present invention is directed to an object detection system including an interface for inputting a first video frame and a second video frame;

a convolutional neural network that generates a first set of predicted object locations using only one of the first video frame and the second video frame; and a controller that (a) generates a second set of predicted object locations based on pixel differences between the first video frame and the second video frame, and (b) determines a final set of object locations based on the first set of predicted object locations and the second set of predicted object locations.

According to yet another preferred embodiment, the present invention is directed to a method for detecting objects that includes inputting a first video frame and a second video frame from a camera; generating a first set of predicted object locations using only one of the first video frame and the second video frame; generating a second set of predicted object locations based on pixel differences between the first video frame and the second video frame; and determining a final set of object locations based on the first set of predicted object locations and the second set of predicted object locations.

According to still another preferred embodiment, the present invention is directed to a non-transitory computer readable storage medium storing a program for causing one or more processors to perform an object detection method that includes inputting a first video frame and a second video frame from a camera; generating a first set of predicted object locations using only one of the first video frame and the second video frame; generating a second set of predicted object locations based on pixel differences between the first video frame and the second video frame; and determining a final set of object locations based on the first set of predicted object locations and the second set of predicted object.

These and other aspects of the present invention will be explained below with respect to the preferred embodiments.

DESCRIPTION OF THE PREFERRED EMBODIMENTS

Preferred embodiments of the invention are described below with reference to the figures. Those skilled in the art will recognize various modifications and substitutions that could be made to the preferred embodiment, and the invention should not be deemed limited to the specific details of the preferred embodiments described herein but rather the metes and bounds of the invention should be understood with reference to the appended claims.

In the preferred embodiment, object detection based on a Deep Learning framework is implemented using a neural network. A pixel difference framework is then used to reduce errors in the detection results provided by the neural network. The preferred embodiment described below is discussed in the context of detecting a person in camera images, but those skilled in the art will appreciate that it can be applied to detect other objects including, for example, vehicles.

Figure 1:
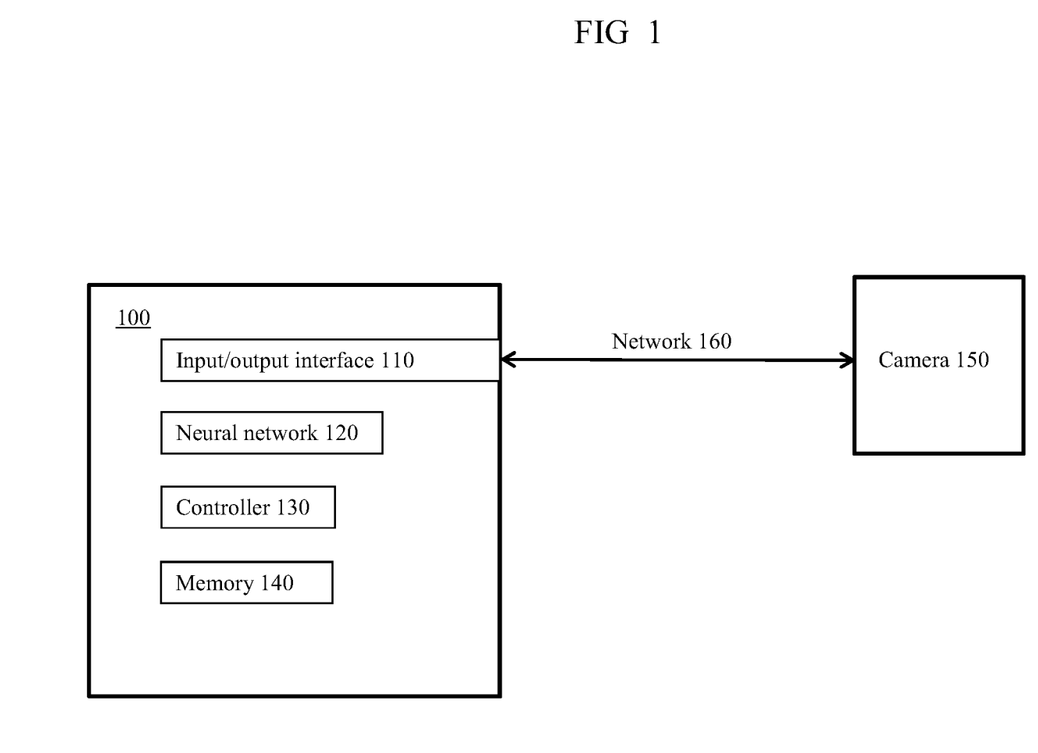
FIG. 1 shows a block diagram of an arrangement of hardware components of a detection system according to one preferred embodiment of the invention.

FIG. 1 shows an overview of a detection system 100 according to one preferred embodiment. The detection system 100 includes an input/output interface 110 to receive image data and, when desired, output final detection results to another device, a neural network 120, a controller 130, and a memory 140. The input interface 110 receives video frames from a camera 150. In this preferred embodiment, the camera 150 is positioned in a fixed location, and the video frames are transmitted to the input/output interface 110 via a network 160. The network 160 may be a local area network (LAN) or an internet-based network, and it may be a wired or wireless network. Hence, the detection system 100 need not be located in close proximity to the camera 150, but instead they can be located remote from each other. For example, the images from the camera 150 can be transmitted to a remote location for processing as an instance of cloud-based computing. On the other hand, if desired, the network 160 can be eliminated and the camera 150 can be integrated into, or directly connected via cable to, the detection system 100.

In this preferred embodiment, a Deep Learning approach called a Single-Shot Multibox Detector (SSD) is used for detecting the position of person(s) in video frames from a fixed camera. The SSD uses a convolutional neural network (CNN) and is designed to automatically recognize the locations of object(s) within an image using only the original image itself. More specifically, the SSD can predict the position of person(s) from a single video frame, provided that it has been trained using a large set of images containing annotations for the positions of person(s) within those images or using a different set of images. The SSD can be used to detect different types of objects depending on the way the neural network has been trained. (Training will be discussed further below in the context of a specific example.)

The SSD object detection network is known to those skilled in the art and is described, for example, in the article "SSD: Single Shot MultiBox Detector" by Wei Liu, et al., arXiv: 1512.02325v5 [cs.CV], Dec. 29, 2016, which is herein incorporated by reference. The SSD outputs results indicating the predicted positions of person(s) in the form of bounding boxes enclosing the detected object. The SSD Deep Learning framework for detection of person(s) allows for more accurate detection compared to non-Deep Learning frameworks, such as classical approaches based on pixel differences. One reason is that approaches based on pixel differences are only effective for detecting person(s) who are in motion (that is, without motion there would be no pixel differences between two frames to allow the detection), whereas the SSD Deep Learning framework can detect person(s) regardless of their motion.

The SSD object detection network (as well as other Deep Learning frameworks), will invariably produce false alarm predictions (i.e., false positives) and missed predictions (i.e., false negatives). As mentioned above, a false alarm prediction is when the network predicts the presence of a person in a video frame, at a position where no actual person exists. A missed prediction is when the network fails to predict the position of a person in a video frame, where a person does exist. For purposes of evaluating whether a bounding box prediction is an accurate result, the Intersection over Union (IoU) of the bounding box with bounding boxes surrounding actual objects is analyzed. A bounding box is determined to be a false alarm prediction if there is no ground-truth bounding box that has an IoU of 0.5 or more with the predicted bounding box. A missed prediction occurs when a ground-truth bounding box does not have an IoU of 0.5 or more with any predicted bounding box. (In other words, the accuracy of predictions can be checked by manually inspecting an image to determine where bounding boxes surrounding actual objects should be located and comparing those locations to the bounding boxes predicted by the system.)

In operation, the SSD framework uses a confidence threshold to determine whether to retain a particular predicted bounding box in the results. Each predicted object location (i.e., each predicted bounding box) has an associated confidence value indicating the probability that the object enclosed by the predicted bounding box is a person. The SSD framework generates these probabilities or confidence values. If the confidence value corresponding to a predicted bounding box exceeds the confidence threshold, then the bounding box prediction is retained. However, this threshold must be selected appropriately. If the threshold is too high, fewer bounding-box predictions will be retained, likely resulting in more missed predictions. If the threshold is too low, more bounding-box predictions will likely be made, including predictions at locations where no person(s) exist. This results in more false alarm predictions.

In this preferred embodiment, a pixel difference framework is used in conjunction with the SSD framework to reduce the number of inaccurate results. The pixel difference framework can predict the position of an object that moved during the time between one video frame and the next video frame from a fixed camera, and is computationally inexpensive. For example, if a walking person is captured in a sequence of video frames with a fixed background, the pixel-difference framework can identify the position of the moving person in each video frame. By combining the pixel-difference framework with the SSD framework, a framework with greater accuracy for predicting the positions of persons(s) in a sequence of video frames can be obtained. Moreover, the combined approach is not significantly more computationally expensive compared to the standalone SSD framework.

The pixel difference framework first converts the current video frame and the previous video frame to grayscale. (Those skilled in the art will recognize that it is possible to use video frames that are separated by one or more other frames in the pixel detection framework. That is, those skilled in the art will recognize that it is possible to select two consecutive video frames or two non-consecutive frames separated by some time interval. In most common video capture scenarios (using standard cameras), consecutive video frames have such a short time interval that it may be difficult to detect motion of objects such as humans. However, a large time interval between selected frames can also miss objects that move through the scene relatively fast.) The pixel difference framework then computes the difference between the pixels of the two frames. Pixel differences exceeding a certain contrasting threshold are considered to be due to the movement of object(s) across the two frames. In this preferred embodiment, the pixel difference framework is implemented using programming functions from the OpenCV (Open Source Computer Vision) library, and the contrasting threshold is automatically generated by the OpenCV software. The positions of the pixels exceeding the contrasting threshold are assumed to correspond to the position of a moving object, and a bounding box is drawn around the object using the pixel differences. The time required by the pixel difference framework to produce the bounding boxes is only a small fraction of the time required by the SSD to produce bounding boxes, so the use of the pixel difference framework does not add significantly to the overall complexity or speed of the object detection system.

Figure 2:
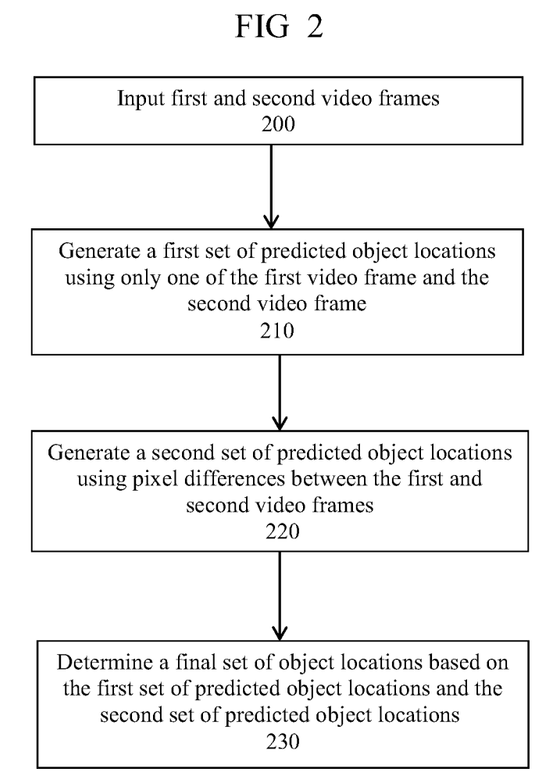
FIG. 2 shows a flow chart of one preferred embodiment of a process for detecting objects in accordance with the present invention.

A method for object detection according to this preferred embodiment will be described with respect to FIG. 2. In block 200, first and second video frames are input into the object detection system. In block 210, a first set of predicted object locations is generated using only one of the first video frame and the second video frame. In the preferred embodiment, the second (i.e., later) of the two frames is used. Note that it is possible for a set of predicted object locations to be an empty set. In block 220, a second set of predicted object locations is generated using the pixel difference framework. In block 230, a final set of object positions is determined based on the first set of predicted object locations and the second set of predicted object locations.

The final set of object positions can be output to another device, output to a display device, or further analyzed by the object detection system. For example, in a security monitoring environment, detection of one or more person(s) in the final set of object positions can be used for a variety of purposes such as tracking a person, triggering an alert, triggering further analysis of found objects, causing the video frames to be stored with associated information such as time and/or location, or sending control commands to a camera to cause it to capture higher resolution images, to zoom in on the region where a person is located, or to change its angle to track a person. In a traffic monitoring environment, for example, the detection of one or more vehicle(s) in the final set of object positions can be used for a variety of purposes (with additional processing, as needed) such as tracking a vehicle, detecting the speed of a moving vehicle, causing the video frames to be stored with associated information such as time, location, and/or speed, or sending control commands to a camera to cause it to capture higher resolution images or to zoom in on the region where a vehicle is located or on a particular portion of a vehicle (for example, to capture an image of a vehicle license plate region when a vehicle is detected in an image).

The method according to the preferred embodiment will next be described in further detail with respect to FIG. 3. In particular, a preferred embodiment for combining the results from the two frameworks (that is, determining the final set of object locations based on the set of predicted object locations generated using each framework) will be explained with respect to FIG. 3. As mentioned above, the SSD framework generates a confidence value associated with each predicted object location (i.e., each predicted bounding box). If the confidence value is high, the respective predicted object location can be deemed an actual object location (and therefore retained in the final set of object locations) with high confidence. On the other hand, if the confidence value is relatively low, then the predicted object location is unlikely to be an actual object location and can be excluded from the final set of object locations. However, when the confidence value falls within a certain range, there is a reasonable likelihood that the predicted object location corresponds to an actual object, but the results of the pixel difference framework are used to further evaluate such predicted object locations.

Accordingly, the preferred embodiment uses multiple thresholds to evaluate predicted object locations and determine the final set of object locations. More specifically, the combination of the SSD framework with the pixel difference framework according to this preferred embodiment uses three parameters that can be set for the object detection system:

(i) A first threshold (i.e., first SSD confidence threshold) above which a predicted object location from the SSD is counted as an actual object location (that is, is included in the final set of object locations), regardless of the results of the pixel difference framework. This first threshold is referred to herein as a hard threshold or (SSD_HARD_CONF).

(ii) A second threshold (i.e., second SSD confidence threshold) above which a predicted object location from the SSD is counted as an actual object location only if the results of the pixel difference framework confirm that the predicted object location corresponds to an object. This second threshold is referred to herein as a soft threshold or (SSD_SOFT_CONF). The second threshold is lower than the first threshold.

(iii) A third threshold used in conjunction with the second threshold to determine whether the results of the pixel difference framework confirm that a predicted object location generated by the SSD corresponds to an object. In this preferred embodiment, the IoU between a predicted bounding box generated by the SSD and a predicted bounding box generated by the pixel difference framework is used to make that determination. In particular, the results of the pixel difference framework are deemed to confirm that a particular predicted object location generated by the SSD corresponds to an object if the bounding box corresponding to the particular predicted object location generated by the SSD has an IoU greater than or equal to the third threshold with any bounding box corresponding to a predicted object location generated by the pixel difference framework. The third threshold is referred to herein as an IoU threshold.

Hence, in this preferred embodiment, a predicted object location generated by the SSD is included in the final set of object locations if (i) it has a confidence value that is greater than or equal to the first threshold (that is, the hard threshold) or if (ii) it has a confidence value that is greater than or equal to the second threshold (but less than the first threshold) and the bounding box corresponding to the predicted object location has an IoU greater than or equal to the third threshold with a bounding box corresponding to a predicted object location generated by the pixel difference framework.

Figure 3:
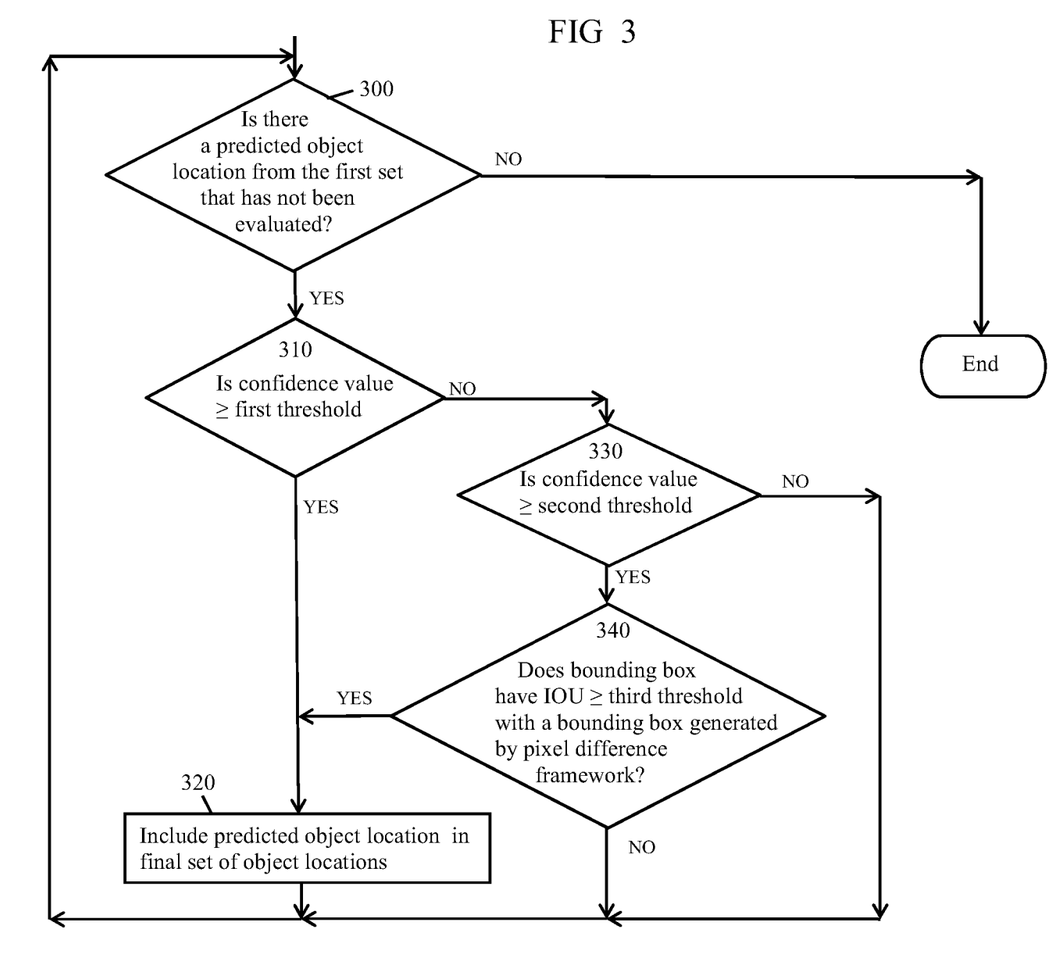
FIG. 3 shows a flow chart of one preferred embodiment of a process for determining a final set of object locations using a first set of predicted object locations generated using only one of a first video frame and a second frame and a second set of predicted object locations generated using pixel differences between the first video frame and the second video frame.

Turning to FIG. 3, further details regarding the preferred embodiment of block 230 in FIG. 2 will be described. In block 300 it is determined whether there are any predicted object locations in the first set of object locations (that is, the predicted object locations generated by the SSD) that have not been evaluated. If yes, then the process proceeds to block 310. If no, then the process ends.

In block 310, the confidence value of the predicted object location being evaluated is compared to the first threshold (i.e. the hard threshold). If the confidence value is greater than or equal to the first threshold, then the process proceeds to block 320 to include the predicted object location in the final set of object locations, and then flow returns to block 300 to determine whether there are any more predicted object locations from the SSD results to be evaluated.

If it is determined in block 310 that the confidence value of the predicted object location being evaluated is not greater than or equal to the first threshold, then flow proceeds to block 330. In block 330, the confidence value of the predicted object location being evaluated is compared to the second threshold. If the confidence value is greater than or equal to the second threshold (i.e. the soft threshold), then flow proceeds to block 340. If it is determined in block 330 that the confidence value of the predicted object location being evaluated is not greater than or equal to the second threshold, then flow returns to block 300 to determine whether there are any more predicted object locations from the SSD results to be evaluated.

In block 340, it is determined whether the bounding box corresponding to the predicted object location being evaluated has an IoU greater than or equal to the third threshold with a bounding box generated by the pixel difference framework i.e., a bounding box corresponding to a predicted object location in the second set). If it is determined that this is the case, then flow proceeds to block 320 to include the predicted object location in the final set of object locations, and then flow returns to block 300 to determine whether there are any more predicted object locations from the SSD results to be evaluated. If it is determined that the bounding box does not have an IoU greater than or equal to the third threshold with a bounding box generated by the pixel difference framework, then flow returns to block 300 to determine whether there are any more predicted object locations from the SSD results to be evaluated. (In other words, evaluation moves on to the next predicted object location without including the current one in the final set of object locations.) In this manner, each predicted object location from the set of predicted object locations generated by the SSD is evaluated based on the first threshold and, if appropriate, based on the second and third thresholds, and a determination is made as to whether that predicted object location should be included in the final set of object locations.

In the preferred embodiment, the SSD outputs an entire set of predicted object locations and then each of those predicted object locations is evaluated (by comparing the corresponding confidence value to the first and second thresholds and, if appropriate, determining the IoU with predicted bounding boxes generated by the pixel difference framework and comparing the IoU values to the third threshold).

As described above, an alternative framework (that is, the pixel difference framework) is combined with the results of a Deep Learning framework (that is, the SSD framework) to improve detection accuracy. There are other alternative frameworks that might be considered for combination with the SSD framework. However, using more complex approaches alongside the SSD deep learning approach could result in significantly decreased speeds. For example, another detection approach that obtains the positions of person(s) in an image is the semantic segmentation approach. Some implementations of semantic segmentation use, for example, a Deep Learning approach with high computational complexity, which requires significantly greater computation time compared to the pixel difference approach. The extra computation time required by the semantic segmentation approach would contribute to a significant decrease in computational speed if the semantic segmentation approach were combined with the SSD Deep Learning approach. In contrast, adding the pixel-difference approach to the SSD approach does not significantly decrease the speed of the detection system, compared to using the SSD approach alone.

Apart from the semantic segmentation approach, there are other Deep Learning methods—besides SSD—that can advantageously be used together with a simple motion estimation approach such as the pixel difference framework. Examples of other person detection methods are Faster-RCNN (Region-based Convolutional Neural Network) and YOLO (You Only Look Once).

Figure 4:
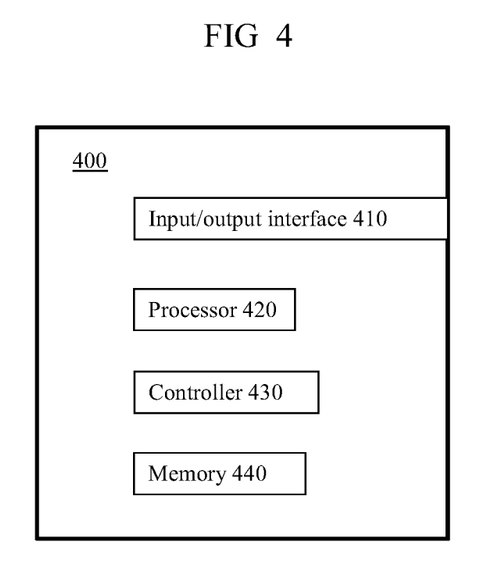
FIG. 4 shows a block diagram of an alternative arrangement of hardware components in accordance with a preferred embodiment of the invention.

FIG. 4 is an alternative block diagram illustrating components of a detection system. (A camera and network are not shown in FIG. 4.) Those skilled in the art will appreciate that, like the configuration shown in FIG. 1, the configuration shown in FIG. 4 is merely an example embodiment. The configuration shown in FIG. 1 depicts an interface integrated with the detection system, and a camera is connected to the interface via a network. On the other hand, FIG. 4 shows an interface integrated with the detection system, and the interface can receive images from various types of sources, not necessarily requiring a network. However, it is all possible for all the components to be in separate computers connected by one or more networks. In other words, the interface that receives images could have a network connection with the neural networks (or processors). Similarly, the controller and/or memory could also connect with the other components over a network. Furthermore, some components could be in a local-area network, other components could be in the cloud, and other components could be in the edge (boundary of a local network and the cloud).

As shown in FIG. 4, the detection system 400 includes an input/output interface 410 for receiving images and, where desired, outputting the detection results. The detection system 400 further includes a processor 420, and one skilled in the art would understand that a neural network can be implemented using one or more processors. Furthermore, although a single processor 420 is illustrated, one skilled in the art would understand that functions can be shared by more than one processor. Also, one skilled in the art would understand that processor 420 (or additional processors, if used) can implement the functions of a controller 130 as used in detection system 100 shown in FIG. 1, if necessary. Alternatively, a separate controller or processor 430 can be used for system control functions. The detection system also includes memory 440 for storing control programs and/or for data storage. Memory 440 may be a combination of multiple memories of the same or different types, as appropriate for the way in which the memory will be used.

While the IoU can be evaluated for every bounding box from the SSD framework with respect to every bounding box from the pixel difference framework, in the preferred embodiment some of the bounding boxes from the pixel difference framework are not used if they are below a certain size. Thus, the IoU is evaluated for every bounding box from the SSD framework with respect to every bounding box from the pixel difference framework that exceeds a particular size.

A specific example of results obtained by a preferred embodiment will now be explained. As mentioned above, the SSD object detection network (as with other neural networks) must be trained. According to this example, the SSD network was trained for detecting the positions of person(s) within images using an image database. Over 20,000 images containing person(s) were used for training More specifically, the images were annotated with bounding boxes encompassing person(s) appearing in the training images, so that the SSD network could be trained to recognize person(s) appearing in an image.

After training, the detection system was then applied to a sequence of 1148 images from a fixed camera, where many of the images contained the presence of person(s). (Not all of the 1148 images have a person appearing in the image, but several of them have multiple persons appearing in the image.) When an image was presented to the network during inference, the network produced bounding box prediction(s) to indicate the position of person(s) in the image. Images used for training and images used for detection were first re-sized to 448×448 pixels prior to being processed by the SSD network.

Table 1 shows the results of multiple experiments that were performed using the preferred embodiment of the detection system, in which the value of the first threshold (SSD_HARD_CONF) was set to 0.4 and the values of the other thresholds were varied. The output of the detection system was compared to the actual person(s) contained in the respective images to determine whether false alarms and/or missed predictions occurred for each image. The results in Table 1 indicate the false alarms and missed predictions, along with their sums. The results were computed across the 1148 images, and Table 1 shows the resulting totals for False alarms (FA), Missed detections, i.e., "Miss" (M), and combined FA+M for various different combinations of values for SSD_HARD_CONF, SSD_SOFT_CONF, and IoU threshold, when the combined SSD and pixel difference frameworks were used, as well as the results when the SSD framework was operated as a standalone system without using the results of the pixel difference framework. (The results in Table 1 indicate a proportion of the total persons appearing in all 1148 images.)

TABLE 1

| Expt | Framework | SSD_HARD_CONF | SSD_SOFT_CONF | IoU | False Alarm (FA) | Miss (M) | FA + M |
|---|---|---|---|---|---|---|---|
| 1 | SSD + Pixel Diff | 0.4 | 0.1 | 0.15 | 0.24 | 0.32 | 0.56 |
| 2 | SSD + Pixel Diff | 0.4 | 0.1 | 0.3 | 0.20 | 0.40 | 0.60 |
| 3 | SSD + Pixel Diff | 0.4 | 0.15 | 0.3 | 0.17 | 0.41 | 0.58 |
| 4 | SSD + Pixel Diff | 0.4 | 0.2 | 0.15 | 0.17 | 0.38 | 0.55 |
| 5 | SSD + Pixel Diff | 0.4 | 0.2 | 0.3 | 0.16 | 0.44 | 0.60 |
| 6 | SSD Standalone | 0.4 | — | — | 0.12 | 0.51 | 0.63 |

Based on the results shown in Table 1, it can be seen that combining the SSD and pixel difference frameworks results in lower sums of the False Alarm and Miss values compared to the SSD standalone. In particular, use of the SSD framework alone (Expt 6) resulted in a combined FA+M rate of 0.63, whereas the combined rate of FA+M for every other experiment, in which the SSD framework was combined with the pixel difference framework, was lower than 0.63. The lower FA+M sums are due to the significantly lower Miss values. Although FA+M sums for Expt 1 through Expt 5 include higher False Alarm (FA) values than the SSD standalone configuration in Expt 6 (when using the SSD_HARD_CONF threshold of 0.4), the lower Miss values more than compensate, such that the overall totals are lower when using the combined frameworks.

The rationale behind the choice of the parameters in the experiments was as follows:

1) At a SSD_HARD_CONF threshold of 0.4, there are missed predictions by the SSD framework (in Expt 5 in Table 1, the miss rate is 0.51).

2) At a lower threshold, fewer missed predictions will occur, but more false alarm predictions will occur.

3) Therefore, an IoU threshold is used so that, when the lower confidence threshold is used (i.e., SSD_SOFT_CONF rather than SSD_HARD_CONF), the bounding boxes from the pixel difference framework are used to "filter out" some of the false alarm predictions of the SSD framework that occur when using the lower threshold. This configuration results in more false alarm predictions (because more predictions are made when using the lower threshold), but as shown in Table 1, there are also significantly fewer missed predictions.

Note that the IoU threshold can also affect the rate of missed predictions. Based on Expt 4 and Expt 5 in Table 1, it is evident that a lower IoU threshold reduces the missed detections. This is due to the fact that correct predictions with probabilities below the SSD_HARD_CONF threshold do not have to overlap as much with the bounding boxes from the pixel difference framework in order to be retained.

Figure 5:
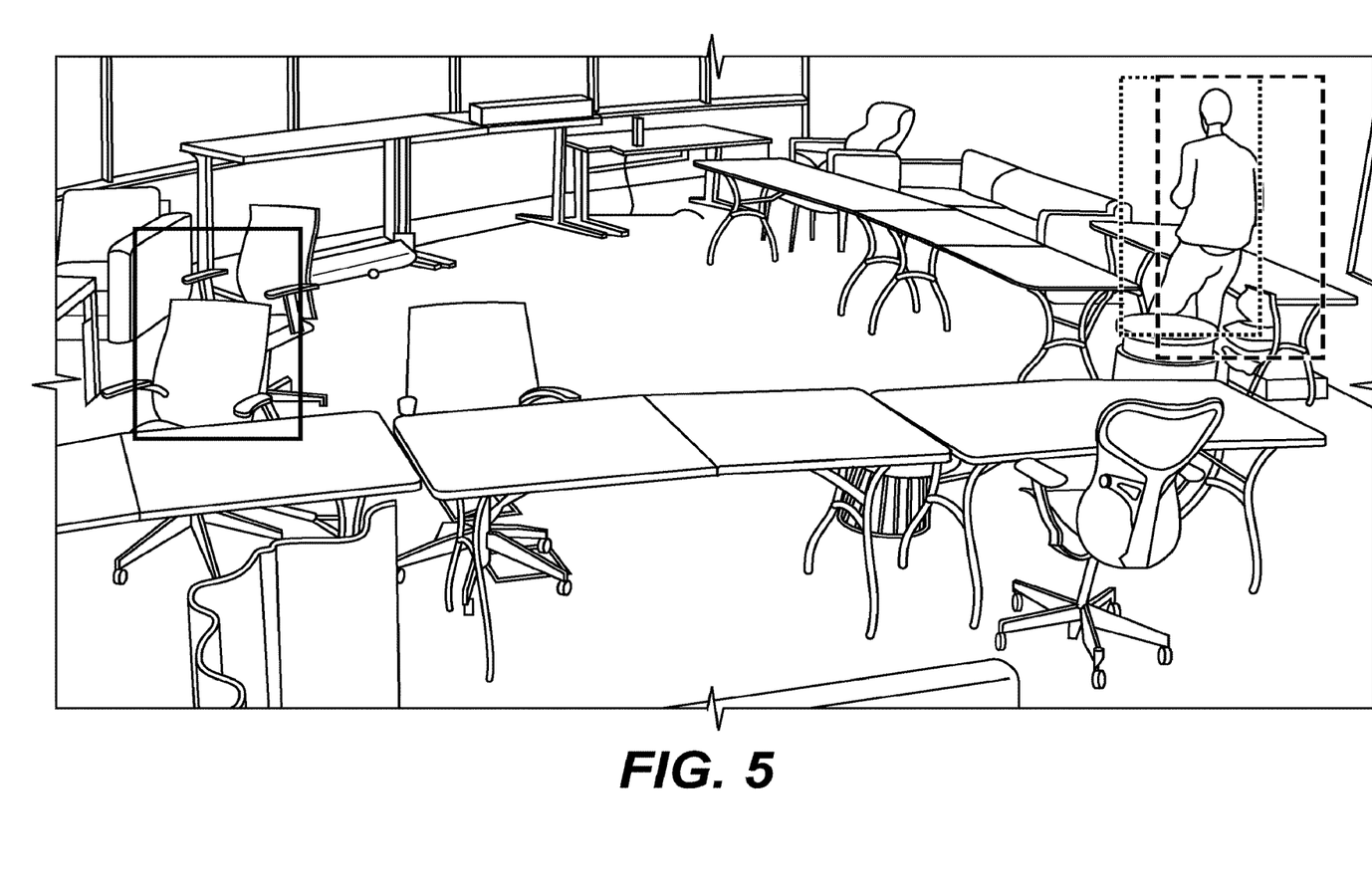
FIG. 5 shows an example of an image including bounding boxes surrounding predicted locations of a person.

FIG. 5 shows a sample result of the combined pixel difference and SSD frameworks, and illustrates the advantage of the combination. In FIG. 5, the dashed line box is a bounding box prediction from the pixel difference framework. The solid line box is the bounding box of an incorrect prediction from the SSD framework that has a low probability (0.318), below the SSD_HARD_CONF threshold of 0.4 but above the SSD_SOFT_CONF threshold of 0.2. The dotted line box that partially overlaps the dashed line box is the bounding box of a correct prediction from the SSD framework that also has a low probability (0.263). This correct prediction is retained because it overlaps with a bounding box from the pixel difference framework with an IoU value of 0.448 that exceeds the IoU threshold.

Overall, the experiments show that combining the SSD deep learning framework with the pixel difference framework can lead to better overall detection of person(s) in video frames from a fixed camera.

In the preferred embodiment described above, the best overall performance was obtained in Expt 4, in which the value used for the first threshold (SSD_HARD_CONF) was 0.4, the value used for the second threshold (SSD_SOFT_CONF) was 0.2, and the value used for the third threshold (IoU threshold) was 0.15. Those skilled in the art will appreciate that these values could be varied to better tailor the object detection system for a specific application. As discussed above, the values of the thresholds impact whether the system will produce relatively more false alarms or missed predictions. Thus, if a specific application would be more tolerant of missed predictions but false alarm predictions are more strongly undesirable, then appropriate values for the thresholds can be chosen, and vice versa.

While various example embodiments have been described above, it should be understood that they have been presented by way of example, and not limitation. It is apparent to persons skilled in the relevant art(s) that various changes in form and detail can be made therein. Thus, the invention should not be limited by any of the above described example embodiments. Also, as used herein, the singular forms "a," "an," and "the," are intended to include the plural forms as well, unless the context clearly indicates otherwise.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures described herein need not be performed in the order presented.

We claim:

1. An object detection system comprising:
at least one memory storing instructions; and
at least one processor that, upon executing instructions stored in the memory, controls the object detection system to perform the functions of:
inputting a first video frame and a second video frame from a camera;
generating a first set of predicted object locations using only one of the first video frame and the second video frame;
generating a second set of predicted object locations based on pixel differences between the first video frame and the second video frame; and
determining a final set of object locations based on the first set of predicted object locations and the second set of predicted object locations,
wherein each predicted object location in the first set is indicated by a bounding box and has an associated confidence value, and each predicted object location in the second set is indicated by a bounding box,
wherein, for each predicted object location in the first set, the determining includes the respective predicted object location in the final set of object locations when confidence value associated with the respective predicted object location is greater than or equal to a second threshold that is lower than a first threshold, and the bounding box corresponding to the respective predicted object location has an Intersection over Union (IoU) that is greater than or equal to a third threshold with a bounding box corresponding to one of the predicted object locations in the second set.

2. The object detection system according to claim 1, wherein, for each predicted object location in the first set, the determining includes the respective predicted object location in the final set of object locations when the confidence value associated with the respective predicted object location is greater than or equal to the first threshold.

3. The object detection system according to claim 1, wherein the first set of predicted object locations is generated using a Single-Shot Multibox Detector (SSD) convolutional neural network.

4. The object detection system according to claim 3, wherein the first threshold is 0.4.

5. The object detection system according to claim 4, wherein the second threshold is 0.2 and the third threshold is 0.15.

6. The object detection system according to claim 1, wherein the first video frame and the second video frame are successive frames.

7. An object detection system comprising:
an interface for inputting a first video frame and a second video frame;
a convolutional neural network that generates a first set of predicted object locations using only one of the first video frame and the second video frame; and
a controller that (a) generates a second set of predicted object locations based on pixel differences between the first video frame and the second video frame, and (b) determines a final set of object locations based on the first set of predicted object locations and the second set of predicted object locations, wherein each predicted object location in the first set is indicated by a bounding box and has an associated confidence value, and each predicted object location in the second set is indicated by a bounding box, wherein, for each predicted object location in the first set, the controller includes the respective predicted object location in the final set of object locations when the confidence value associated with the respective predicted object location is greater than or equal to a second threshold that is lower than a first threshold, and the bounding box corresponding to the respective predicted object location has an Intersection over Union that is greater than or equal to a third threshold with a bounding box corresponding to one of the predicted object locations in the second set.

8. The object detection system according to claim 7, wherein the convolutional neural network is a Single-Shot Multibox Detector (SSD).

9. The object detection system according to claim 7, wherein, for each predicted object location in the first set, the controller includes the respective predicted object location in the final set of object locations when the confidence value associated with the respective predicted object location is greater than or equal to the first threshold.

10. The object detection system according to claim 9, wherein the first threshold is 0.4.

11. The object detection system according to claim 10, wherein the second threshold is 0.2 and the third threshold is 0.15.

12. A method for detecting objects, comprising:
inputting a first video frame and a second video frame from a camera;
generating a first set of predicted object locations using only one of the first video frame and the second video frame;
generating a second set of predicted object locations based on pixel differences between the first video frame and the second video frame; and
determining a final set of object locations based on the first set of predicted object locations and the second set of predicted object locations,
wherein each predicted object location in the first set is indicated by a bounding box and has an associated confidence value, and each predicted object location in the second set is indicated by a bounding box,
wherein, for each predicted object location in the first set, the determining includes the respective predicted object location in the final set of object locations when confidence value associated with the respective predicted object location is greater than or equal to a second threshold that is lower than a first threshold, and the bounding box corresponding to the respective predicted object location has an Intersection over Union (IoU) that is greater than or equal to a third threshold with a bounding box corresponding to one of the predicted object locations in the second set.

13. The object detection system according to claim 12, wherein, for each predicted object location in the first set, the determining includes the respective predicted object location in the final set of object locations when the confidence value associated with the respective predicted object location is greater than or equal to the first threshold.

14. The method according to claim 12, wherein the generating of the first set of predicted object locations uses a Single-Shot Multibox Detector (SSD) convolutional neural network.

15. The method according to claim 14, wherein the first threshold is 0.4.

16. The method according to claim 15, wherein the second threshold is 0.2 and the third threshold is 0.15.

17. A non-transitory computer readable medium storing a program for causing one or more processors to perform an object detection method comprising:
inputting a first video frame and a second video frame from a camera;
generating a first set of predicted object locations using only one of the first video frame and the second video frame;
generating a second set of predicted object locations based on pixel differences between the first video frame and the second video frame; and
determining a final set of object locations based on the first set of predicted object locations and the second set of predicted object locations,
wherein each predicted object location in the first set is indicated by a bounding box and has an associated confidence value, and each predicted object location in the second set is indicated by a bounding box,
wherein, for each predicted object location in the first set, the determining includes the respective predicted object location in the final set of object locations when confidence value associated with the respective predicted object location is greater than or equal to a second threshold that is lower than a first threshold, and the bounding box corresponding to the respective predicted object location has an Intersection over Union (IoU) that is greater than or equal to a third threshold with a bounding box corresponding to one of the predicted object locations in the second set.

18. The non-transitory computer readable medium according to claim 17, wherein, for each predicted object location in the first set, the determining includes the respective predicted object location in the final set of object locations when the confidence value associated with the respective predicted object location is greater than or equal to the first threshold.

* * * * *